(12) United States Patent
Fujii et al.

(10) Patent No.: US 8,583,661 B2
(45) Date of Patent: Nov. 12, 2013

(54) ROUTE SEARCHING APPARATUS AND ROUTE SEARCHING METHOD

(75) Inventors: Daigo Fujii, Nagoya (JP); Toshiyuki Namba, Edogawa-ku (JP); Hiroaki Sekiyama, Setagaya-ku (JP); Keisuke Okamoto, Chofu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 348 days.

(21) Appl. No.: 13/001,524

(22) PCT Filed: Jun. 24, 2009

(86) PCT No.: PCT/JP2009/002897
§ 371 (c)(1),
(2), (4) Date: Feb. 7, 2011

(87) PCT Pub. No.: WO2009/157194
PCT Pub. Date: Dec. 30, 2009

(65) Prior Publication Data
US 2011/0145290 A1      Jun. 16, 2011

(30) Foreign Application Priority Data

Jun. 27, 2008  (JP) ................................. 2008-169279

(51) Int. Cl.
*G06F 7/00*   (2006.01)
*G06F 17/30*  (2006.01)

(52) U.S. Cl.
USPC ........................... 707/749; 707/780; 707/920

(58) Field of Classification Search
USPC ......... 707/705, 706, 736, 748, 749, 758, 769, 707/780, 918, 919, 920
See application file for complete search history.

(56) References Cited

U.S. PATENT DOCUMENTS

| 6,098,015 A | 8/2000 | Nimura et al. |
| 6,615,133 B2 | 9/2003 | Boies et al. |

(Continued)

FOREIGN PATENT DOCUMENTS

| DE | 10 2006 030 271 A1 | 1/2007 |
| EP | 1 085 297 A1 | 3/2001 |

(Continued)

OTHER PUBLICATIONS

G. Pang et al., "Adaptive Route Selection for Dynamic Route Guidance System Based on Fuzzy-Neural Approaches," Jul. 30, 1995, pp. 75-82.

(Continued)

*Primary Examiner* — Marc Somers
(74) *Attorney, Agent, or Firm* — Oliff & Berridge, PLC

(57) ABSTRACT

A route searching apparatus includes a travel route accumulation unit, an algorithm selection unit to select route searching algorithms to meet the preference of a user based on the accumulated travel routes, and a route searching unit to perform a route search up to a destination by using the selected algorithms. Preferably, the algorithm searching unit searches for each of the travel routes accumulated in the accumulation unit by means of several algorithms, calculates, for each algorithm, a match rate between the searched route and the actual travel route, and selects an algorithm of the highest match rate. Also, it is preferable that a condition common to roads avoided by the user is extracted from the accumulated travel routes, and a route search is performed by adjusting search costs so as to make such roads less prone to be selected.

12 Claims, 11 Drawing Sheets

(56) References Cited

U.S. PATENT DOCUMENTS

| | | |
|---|---|---|
| 2005/0192742 A1 | 9/2005 | Okochi |
| 2007/0005240 A1 | 1/2007 | Oumi et al. |
| 2010/0070160 A1* | 3/2010 | Haatainen et al. ............ 701/201 |

FOREIGN PATENT DOCUMENTS

| | | |
|---|---|---|
| JP | A-08-327385 | 12/1996 |
| JP | A-2004-045054 | 2/2004 |
| JP | B2-3596704 | 12/2004 |
| JP | A-2007-240400 | 9/2007 |

OTHER PUBLICATIONS

International Search Report issued in Application No. PCT/JP2009/002897; dated Oct. 2, 2009.

Written Opinion of the International Searching Authority issued in Application No. PCT/JP2009/002897; dated Oct. 2, 2009.

* cited by examiner

Fig. 2A

| ROUTE SET ID (411) | USER ID (412) | OD-ID (413) | ROUTE ID (414) | FREQ. (415) | LAST UPDATE (416) |
|---|---|---|---|---|---|
| 1 | U1 | OD1 | P1 | 1 | 200X/X/X |
| 2 | U1 | OD1 | P2 | 5 | 200X/Y/A |
| 3 | U1 | OD2 | P3 | 10 | 200X/Y/B |
| 4 | U1 | OD2 | P4 | 2 | 200X/Y/Z |
| 5 | U2 | OD1 | P2 | 3 | 200X/Z/C |
| ... | ... | ... | ... | ... | ... |

TRAVEL HISTORY TABLE

Fig. 2B

| ROUTE ID (421) | OD-ID (422) | LINK SERIES (423) |
|---|---|---|
| P1 | OD1 | 2,3,4,5,6,··· |
| P2 | OD1 | 2,3,15,18,21,·· |
| P3 | OD2 | 9,7,17,23,··· |
| P4 | OD2 | 9,11,18,25,··· |
| ... | ... | ... |

ROUTE TABLE

Fig. 2C

| OD-ID (431) | ORIGIN (432) | DEST. (433) |
|---|---|---|
| OD1 | POI 1 | POI 2 |
| OD2 | POI 3 | POI 4 |
| ... | ... | ... |

OD TABLE

※OD: Origin/Destination

Fig. 2D

| POI ID (441) | LATITUDE (442) | LONGITUDE (443) | PLACE (444) |
|---|---|---|---|
| POI 1 | 37.023 | 137.22 | HOME |
| POI 2 | 37.015 | 137.11 | OFFICE |
| ... | ... | ... | ... |

POI TABLE

Fig. 4
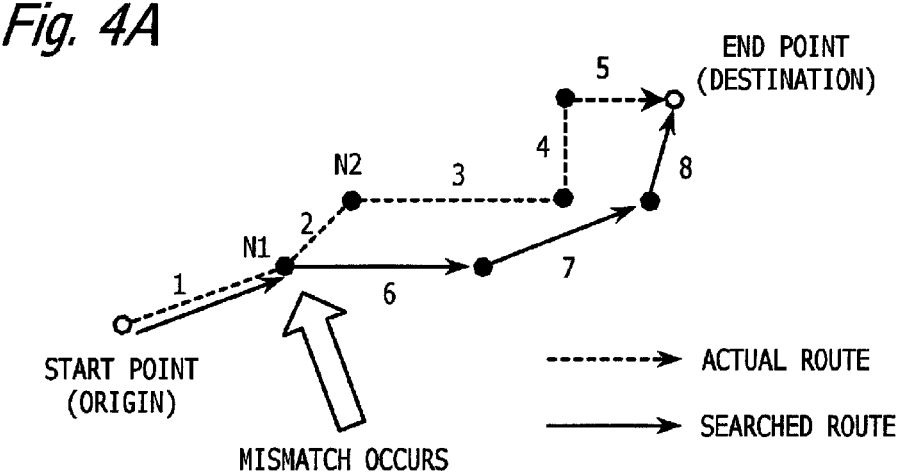
Fig. 4A
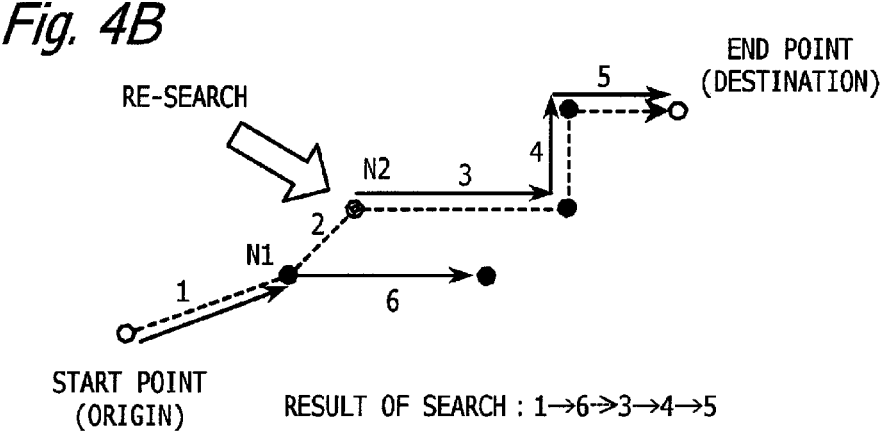
Fig. 4B

Fig. 5

| SEARCH ID 551 | ROUTE ID 552 | OD-ID 553 | SEARCHING ALGORITHM 554 | LINK SEARIES 555 | MATCH RATE 556 |
|---|---|---|---|---|---|
| 1 | P1 | OD1 | SHORTEST DISTANCE | 1,3,4,5,6,··· | 0.78 |
| 2 | P1 | OD1 | MINIMUM TIME | 1,3,4,5,6·· | 0.92 |
| 3 | P1 | OD1 | TOLL ROAD PRIORITY | 1,2,7,9,··· | 0.80 |
| 4 | P1 | OD1 | RIGHT TURN AVOIDANCE | 8,3,4,21,··· | 0.57 |
| 5 | P2 | ··· | ··· | ··· | ··· |
| ··· | ··· | ··· | ··· | ··· | ··· |

55 ROUTE MATCH RATE TABLE

Fig. 6

| USER ID 571 | SEARCHING ALGORITHM 572 | MATCH RATE (PREFERENCE DEGREE) 573 |
|---|---|---|
| 1 | SHOTEST DISTANCE | 0.83 |
| 1 | MINIMUM TIME | 0.90 |
| 1 | TOLL ROAD PRIORITY | 0.65 |
| 1 | RIGHT TURN AVOIDANCE | 0.42 |
| 2 | ··· | ··· |
| ··· | ··· | ··· |

57 ALGORITHM PREFERENCE DEGREE TABLE

Fig. 9

| USER ID (701) | MISMATCH LINK PAIR (702) |
|---|---|
| 1 | 4,5 |
| 1 | 1,3 |
| 1 | 6,9 |
| 2 | 12,45 |
| ... | ... |

7 MISMATCH POINT TABLE

Fig. 11

| USER ID (901) | AVOIDANCE POINT (902) |
|---|---|
| 1 | SCHOOL ROUTE |
| 1 | SIGNAL |
| 1 | RIGHT TURN |
| 2 | CONGESTION |
| ... | ... |

9 AVOIDANCE POINT TABLE

ROUTE SEARCHING APPARATUS AND ROUTE SEARCHING METHOD

TECHNICAL FIELD

The present invention relates to a route search technique for searching for a route to a destination, and more particularly, it relates to such a technique that performs a route search by using a route searching algorithm to meet user's preference.

BACKGROUND ART

In the past, there have been widely used route searching apparatuses (navigation apparatuses) that enables driving on an unfamiliar road in a smooth manner. In the route searching, there exist a plurality of route searching algorithms such as, for example, a shortest travel route algorithm, a shortest travel time algorithm, a toll road priority algorithm, an algorithm of using no toll road, etc. Accordingly, there are adopted the following techniques. That is, route searching is performed after a user is required to designate a route searching algorithm beforehand, or route searching is performed by using a plurality of algorithms, and a plurality of searched routes are presented to a user.

Further, to perform route selection so as to more meet user's preference, the following techniques have been proposed. In a first patent document, there is proposed a technique in which a route calculated based on map data is compared with traveled route data, and search costs are modified based on the result of the comparison to calculate a route to a destination. In addition, in a second patent document, a technique is proposed in which routes and junction or bifurcation points are obtained according to a plurality of search conditions, and a user is required to set his or her favorite guidance route.

CITATION LIST

Patent Literature

PTL 1: Japanese patent No. 3596704
PTL 2: Japanese patent application laid-open No. 2007-240400

SUMMARY OF INVENTION

However, there are the following problems in the above-mentioned prior art. In general, the user's tendency (preference) of route selection does not necessarily meet a predefined route searching algorithm. Accordingly, even if a user is intended to search for a route to meet his or her favor from among the results of searches made according to a plurality of route searching algorithms, it is difficult for the user to determine which route is suitable for his or her purpose in an unknown or unfamiliar place.

The technique described in the first patent document operates effectively only in known or familiar places since the search costs of routes different from actual traveled routes (traveled path data) are modified. In addition, the technique of the second patent document requires user's own operation of selecting a guide route at each junction or bifurcation point, and hence is troublesome.

The present invention has been made in view of the above-mentioned circumstances, and has for its object to present a route that meets a user's preference even in a place where the user has not traveled before.

In order to achieve the above-mentioned object, route searching is carried out according to the following units or processing.

A route searching apparatus according to the present invention is capable of using a plurality of route searching algorithms, and includes a travel route accumulation unit that acquires and accumulates routes which have been traveled, an algorithm selection unit that selects a route searching algorithm to meet preference of a user based on the accumulated travel routes, and a route searching unit that performs a route search up to a destination by using the selected algorithms.

Here, the algorithm selection unit first searches for a route leading from a starting point to a destination point of each of the accumulated travel routes by using the plurality of algorithms, respectively. Then, it calculates, for each algorithm, a match rate (a route match rate) between the route obtained as a result of the search and an actual travel route. Thereafter, it calculates, for each algorithm, a match rate between a route selection tendency of the user and the algorithm (a preference degree of the algorithm). This match rate between the route selection tendency of the user and the algorithm can be calculated for each route based on the route match rate thereof. For example, it is preferable to obtain the match rate of the algorithm by averaging the route match rates of the respective accumulated routes (this can also done by weighted averaging). Then, the algorithm selection unit selects, as an algorithm to meet the preference of the user, an algorithm of which match rate with respect to the route selection tendency of the user is the highest.

Thus, by determining the user's preference to route selection from the past travel routes of the user, it becomes possible to present a route suitable for the user even in an unfamiliar place.

In addition, preferably, the algorithm selection unit in the present invention seeks mismatch points that are points at which the route obtained as a result of the search and the actual travel route branch from each other, and performs, when there exists a mismatch point, a new route search from the mismatch point onward, and calculates the route match rate by making use of this search result, too.

In this regard, for example, when a route resulting from a search and an actual route are different from each other in a point near from the starting point, all paths in the remainder of the entire range become different, but this does not necessarily mean that the user does not like the route searching algorithm. Accordingly, by performing a new route search from the mismatch point onward thereby to obtain the match rate of a new route with respect to the actual route, it becomes possible to make a more accurate determination as to whether the user likes the route searching algorithm.

Moreover, the algorithm selection unit in the present invention can extract a common point (mismatch common point) for a plurality of mismatch points obtained from a plurality of search results. Then, when performing a route search by means of the selected algorithms, the route searching unit preferably performs the route search by making larger the selection cost for a link matching the mismatch common point (making the link less prone to be selected). Here, note that as common points or features, there are listed, for example, traffic information (the presence or absence of a traffic signal, the presence or absence of congestion, one-way traffic, etc.), surrounding POI (Point of Interest) information, (facilities such as shops, schools, etc.), and so on.

If, for many routes, there exist links (types of links) that are different from the search results thereof, a determination can be made that such routes do not meet the preference of the user. Accordingly, by seeking a common mismatch point and making larger the selection cost in such a link, it is possible to perform route selection that more meets the user's preference.

Here, note that in case where a mismatch common point is used as stated above, preferably, the route searching unit makes a search by using the selected algorithms, and when there exists a link matching the common point on the search route, performs a route search again after setting the cost of the link larger.

To modify the costs for mismatch common points in all the links up to the destination increases processing load, and hence a route search is first made without taking account of any mismatch common point, and only when there is a mismatch common point on a searched route, cost modification is carried out, whereby it becomes possible to perform the processing in an efficient manner.

Here, note that by limiting the execution of route re-searching to the time when there exists no avoidance point on the route obtained as a result of the search, or the time when the same route is selected, it becomes possible to obtain a route that meets the preference of the user. However, an upper limit can be set for the frequency of research in consideration of the processing time.

Here, note that the present invention can be caught as a route searching apparatus that has at least part of the above-mentioned units. In addition, the present invention can be understood as a route searching method including at least part of the above-mentioned processing or a program to achieve such a method. The above-mentioned individual units and processing of the present invention can be arbitrarily combined with one another in any possible way to constitute the invention.

According to the present invention, even in a place where a user has not yet traveled before, it becomes possible to present a route that meets the preference of the user.

BRIEF DESCRIPTION OF DRAWINGS

FIGS. 2A through 2D are views showing the construction of a travel history table, a route table, an OD table, and a POI table, respectively.

FIG. 4A is a view explaining mismatch points in a route search, and FIG. 4B is a view explaining re-searching processing at the time when there exist such mismatch points.

FIG. 5 is a view showing the construction of a route match rate table.

FIG. 6 is a view showing the construction of an algorithm preference degree table.

FIG. 9 is a view showing the construction of a mismatch point table.

FIG. 11 is a view showing the construction of an avoidance point table.

DESCRIPTION OF EMBODIMENTS

Now, preferred embodiments of the present invention will be described below in detail by way of example while referring to the accompanying drawings.

First Embodiment

Figure 1:
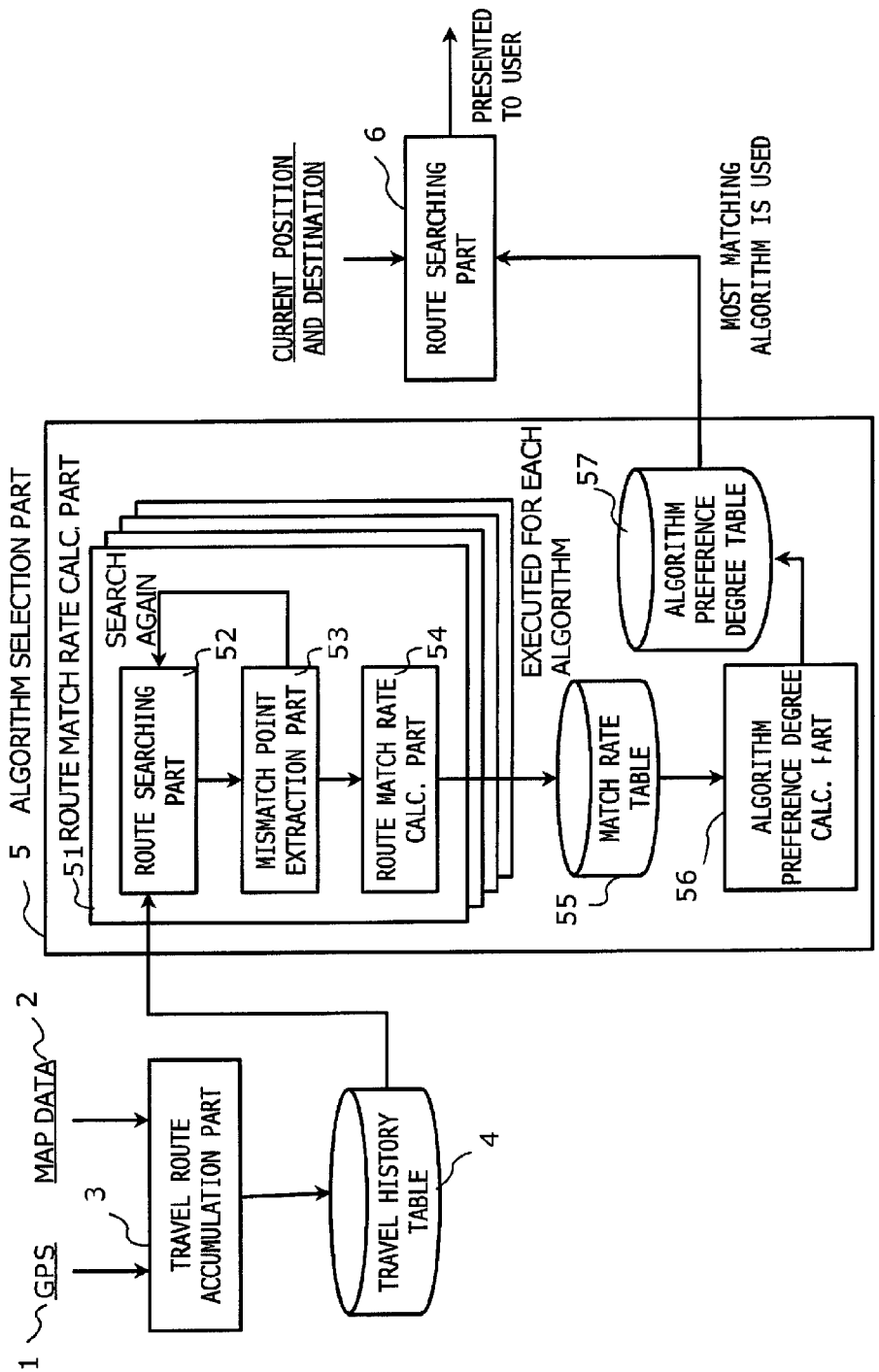
FIG. 1 is a view showing the functional construction of a car navigation apparatus according to a first embodiment of the present invention.

A car navigation apparatus according to this embodiment determines what route selection a user likes by analyzing routes on which the user has thus far traveled, and in case where a route search is freshly performed, a route searching algorithm to meet a user's preference is used. FIG. 1 is a schematic view showing the functional construction of a car navigation apparatus (route searching apparatus) according to this present invention.

This car navigation apparatus is substantially provided with a travel route accumulation part 3, an algorithm selection part 5, and a route searching part 6, wherein the algorithm selection part 5 serves to select a route searching algorithm to meet the preference of a user by analyzing the travel routes accumulated by the travel route accumulation part 3, and the route searching part 6 performs a route search by using the algorithm thus selected.

Here, note that as examples of such a route searching algorithm, there are enumerated a shortest distance (distance priority) algorithm, a minimum time (time priority) algorithm, a toll road priority algorithm, a right turn avoidance algorithm, etc., but the present invention is not limited to these algorithms, and any arbitrary route searching algorithm can be used.

<Route Accumulation Processing>

The travel route accumulation part 3 obtains a travel route (travel link) and stores it in a travel history table 4 by matching position data acquired from a GPS device 1 and map data 2 containing link information. In this embodiment, a searching algorithm to meet the preference of each user is obtained, so it is desirable to store the history data of the travel route for each user. For such a purpose, it is preferable to identify the user at the time when the user operates the apparatus.

A specific construction of the travel history table 4 is shown in FIGS. 2A through 2D. As shown in FIG. 2A, the travel history table 4 has a route set ID 411 for each combination of a user ID 412, an OD (Origin/Destination: a start point/an end point)-ID 413, a route ID 414, and stores therein its travel frequency 415 and the last update date 416 thereof.

A route table (FIG. 2B), an OD table (FIG. 2C), and a POI (Point of Interest) table (FIG. 2D) are used as other tables for assisting the travel history table 4.

The route table stores therein route IDs 421, OD-IDs 422, and link series 423. A link series 423 is that IDs of links constituting a route are arranged in order of the route. As can be seen from the figure, in case where routes are different from each other even if start points and end points thereof are the same, respectively, these routes are stored as records having different route IDs. The OD table stores therein OD data, i.e., OD-IDs 431, start points (origins) 432 and end points (destinations) 433. For the start points and the end points, their positions are stored as POI-IDs. The POI table stores therein POI data, i.e., POI-IDs 441, latitudes 442, longitudes 443, and places 444.

<Algorithm Selection Processing>

The algorithm selection part 5 obtains a route searching algorithm to meet the preference of a user from the travel history table 4 that has been prepared by the travel route accumulation part 3. The algorithm selection part 5 substantially has a route match rate calculation part 51, and an algorithm preference degree calculation part 56. The route match rate calculation part 51 calculates to what extent a route (a route stored in the route table) actually traveled by the user and a route search result obtained according to each searching algorithm match with each other, and stores the results obtained in a match rate table 55. The algorithm preference degree calculation part 56 calculates, from a travel history of routes traveled by each user in the past and the route match rate table 55, an algorithm preference degree that indicates a tendency of which route selection algorithm is favored by each user, and stores it into an algorithm preference degree table 57.

Figure 3:
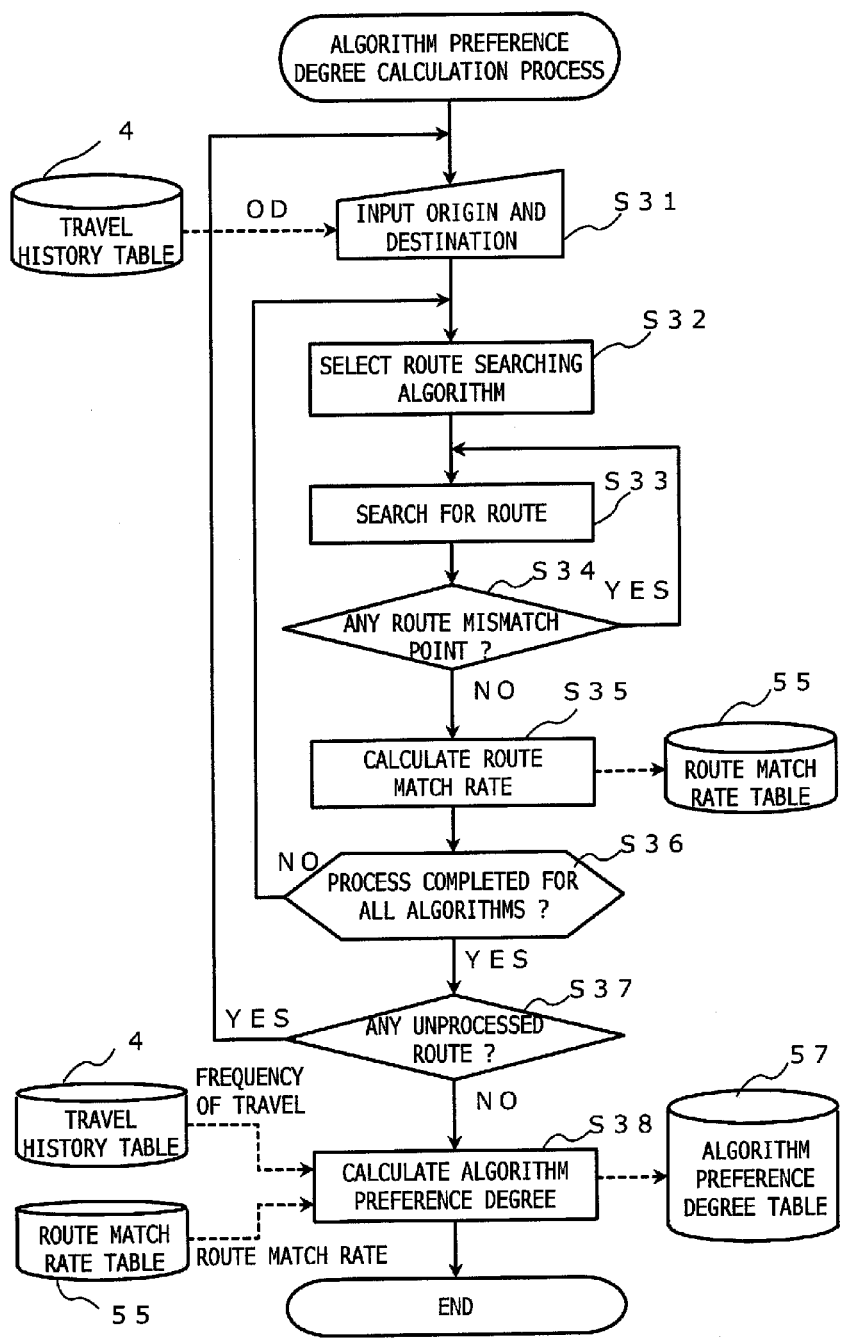
FIG. 3 is a flow chart illustrating the flow of algorithm preference degree calculation processing.

More specifically, the route match rate calculation part 51 in the algorithm selection part 5 is provided with a route searching part 52, a mismatch point extraction part 53, and a route match rate calculation part 54. A detail of the operations of the respective functional parts will be explained below together with a flow chart illustrated in FIG. 3. FIG. 3 is the flow chart illustrating the overall flow of algorithm preference degree calculation processing performed by the algorithm selection part 5.

The route searching part 52 searches, for each of the routes stored in the travel history table 4, a route from its start point (origin) to its end point (destination) according to predefined route searching algorithms. Specifically, in step 31, an start point and an end point of a route stored in the travel history table 4 are first input as a destination condition for route searching. Then, in step S32, one of the predefined route searching algorithms is selected, and in step S33, a route search is executed by using the algorithm thus selected.

In step S34, the mismatch point extraction part 53 extracts mismatch points between an actual travel route and a route obtained as the result of the search. For example, as shown in FIG. 4A, in case where a link series of the actual travel route is 1, 2, 3, 4 and 5 and a link series of the travel route obtained as the search result is 1, 6, 7 and 8, it is judged or determined that a mismatch has occurred at a node N1. In this case, the route searching part 52 returns to step S33, where it performs a route search again by setting, as a start point, a node N2 that is a terminal node of a link (i.e., link 2) on which the mismatch has occurred. This re-searching processing is assumed to be continuously performed as long as there is a mismatch in the search result thereof. In an example of FIG. 4B, a link series of a route as a result of the search becomes to be 1, 6, 3, 4 and 5. Here, note that link 6 and link 3 are not connected to each other, but the purpose is to obtain the match rate of the searched route, so there is no problem in such a result. In addition, by performing re-searching as stated above, it is possible to reflect the user's actual travel history as much as possible when calculating to what extent the tendency of user's route selection and the route searching algorithm meet with each other.

Then, in step S35, the route match rate calculation part 54 calculates a match rate between a route actually traveled by the user and a route for which a search has been made according to a certain route searching algorithm, and stores it in the route match rate table 55. The match rate of a route is a value that denotes to what extent the user's actual travel route and the route searched according to the certain route searching algorithm match with each other. The match rate of a route can be obtained, for example, as (the number of matched links)/(the number of links of an actual travel route), or (the total distance of matched links)/(the total amount distance of an actual travel route). In addition, the match rate of a route can also be obtained as (the number of matched nodes)/(the number of nodes of an actual travel route), or it can be obtained as (the number of matched nodes)/(the number of nodes of an actual travel route) with respect only to nodes that connect links of different kinds of roads to one another.

The calculation of a route match rate is performed according to all the predefined route searching algorithms for each route. Accordingly, in step S36, it is determined whether match rates have been calculated with the use of all the algorithms, and when there is any algorithm by means of which a match rate has not yet been calculated, a return is made to step S32 where the match rate for that algorithm is calculated.

On the other hand, when the match rates of a certain route have been calculated according to all the algorithms (S36: YES), it is then determined in step S37 whether there exists any route for which match rates have not yet been obtained, and when there exists an unprocessed or unfinished route in the travel route or history table 4, a return is made to step S31 where the match rates of that route are calculated.

The match rates obtained in the above-mentioned manner is stored in the route match rate table 55. An example of the route match rate table 55 is shown in FIG. 5. The route match rate table 55 stores therein search IDs 551, route IDs 552, OD-IDs 553, searching algorithms 554, link series 555, and match rates 556. As shown in this figure, a match rate 556 between a searched route (link series 555) and the actual travel route (route ID 552) is stored for each searching algorithm 554, for each route.

When the match rate of a searched route according to each searching algorithm have been obtained for each route, the algorithm preference degree calculation part 56 calculates the algorithm preference degree of each algorithm (step S38) which is a degree at which the user's route searching tendency and the route searching algorithm match with each other, and stores it into the algorithm preference degree table 57. The algorithm preference degree of a certain searching algorithm is calculated based on match rates between respective routes actually traveled by a user and search results according to the searching algorithm to be examined. For example, it can be obtained by taking an average of the match rates for the respective routes actually traveled by the user which are weighted according to the frequency or number of travels of each route. This weighting can be a value that becomes larger in proportion to the travel frequency. However, in order to prevent the route selection tendency to those routes which are frequently traveled by the user from being excessively reflected, it is preferable to make use of weighting that increases in accordance with the travel frequency but with the rate of increase being gradually decreased. In addition, in order to have a recent route selection tendency reflected more, it is also preferable to decrease the weighting with the increasing lapse of time from the last update date.

FIG. 6 shows an example of algorithm preference degree table 57. The table stores therein user IDs 571, searching algorithms 572, and match rates (preference degrees) 573, as shown in FIG. 6. In this manner, the match rate of each searching algorithm with respect to the route searching tendency of each user, i.e., the preference degree of the searching algorithm of each user, is stored in the algorithm preference degree table.

Here, note that at an appropriate time such as when a user stops a driving operation (i.e., at the time of turning off the engine), or when a user starts a driving operating (i.e., at the time of starting up the engine), the above-mentioned calculation processing of the algorithm preference degree according to the algorithm selection part 5 need only be carried out for a travel history till then. In this regard, there is no need to perform the above-mentioned processing for all the routes every time, but instead the above-mentioned processing need only be carried out for those routes which have been newly added from the last execution thereof. In addition, a travel route of a user might contain a relay or intermediate point (stopover point) while the user travels from an operation start position up to an operation end position, and hence the processing can be done after asking for user's confirmation as to whether there is any relay point. Moreover, although in the above description, it is explained that match rates are obtained for all the travel routes, a part of the travel routes can be excluded from the match rate calculation processing.

<Route Searching Processing>

When a starting point (ordinarily, a point of the current position) and a destination point are provided by a user, the route searching part 6 searches for a route to its destination. When this route search is performed, route selection is carried out by using the most suitable algorithm that meets the preference of the user, by referring to the algorithm preference degree table 57.

Figure 7:
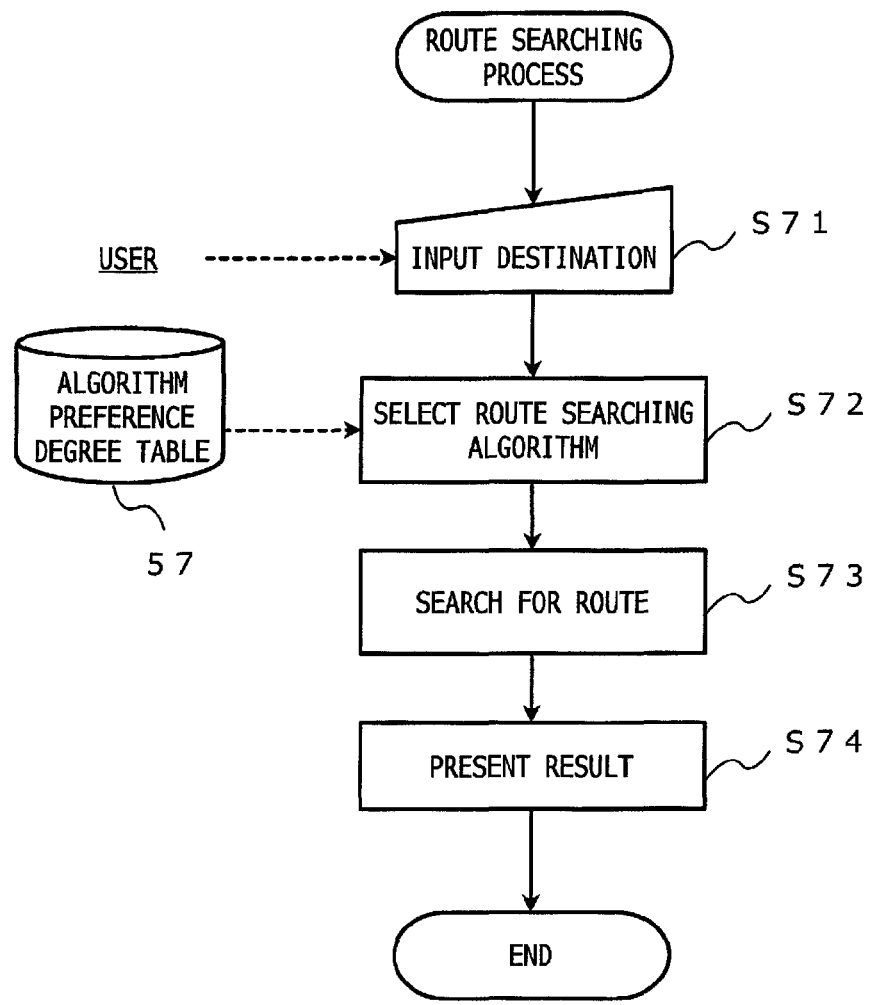
FIG. 7 is a flow chart illustrating the flow of route searching processing.

FIG. 7 is a flow chart illustrating the flow of the route searching processing. First of all, the route searching part 6 receives an input of a destination from a user (step S71). Here, the current position obtained from the GPS device 1 is used as the origin of a route search. Then, a route selection algorithm to most meet the route selection preference of the user is selected by referring to the algorithm preference degree table 57 (step S72). Thereafter, the route searching part 6 performs a search for a route by using the thus selected route searching algorithm (step S73), and presents the result of the search to the user by displaying it on a display device or the like (step S74).

<Effects of this Embodiment>

According to this embodiment, it is possible to determine, from the history of the routes thus far traveled by a user, a route selection algorithm that most meets or matches the preference of route selection of the user. Accordingly, it becomes possible to present a route searched by the route selection algorithm most matched to the user's preference at the time when a route search is freshly carried out.

According to such a method, even in a place where a user has not yet traveled and is unfamiliar, it becomes possible to search for a route that resembles the routes that the user uses in daily life and to present it to the user.

Conventionally, only a few kinds of route searching algorithms have been used, because an increase of algorithms makes it difficult for a user to decide which algorithm to choose. According to this embodiment, however, even in the case of using a multitude of searching algorithms, it is not necessary for a user to explicitly designate which searching algorithm to use. Accordingly, it becomes possible to select, from among the multitude of searching algorithms, the most suitable one to meet the user's preference without placing a burden on the user.

Second Embodiment

A car navigation apparatus according to a second embodiment of the present invention, in addition to having the functions of the first embodiment, extracts points (links) which a user avoids traveling through, and makes it more difficult to select a route including such points, thereby presenting a route that more meets the route searching tendency of the user.

Figure 8:
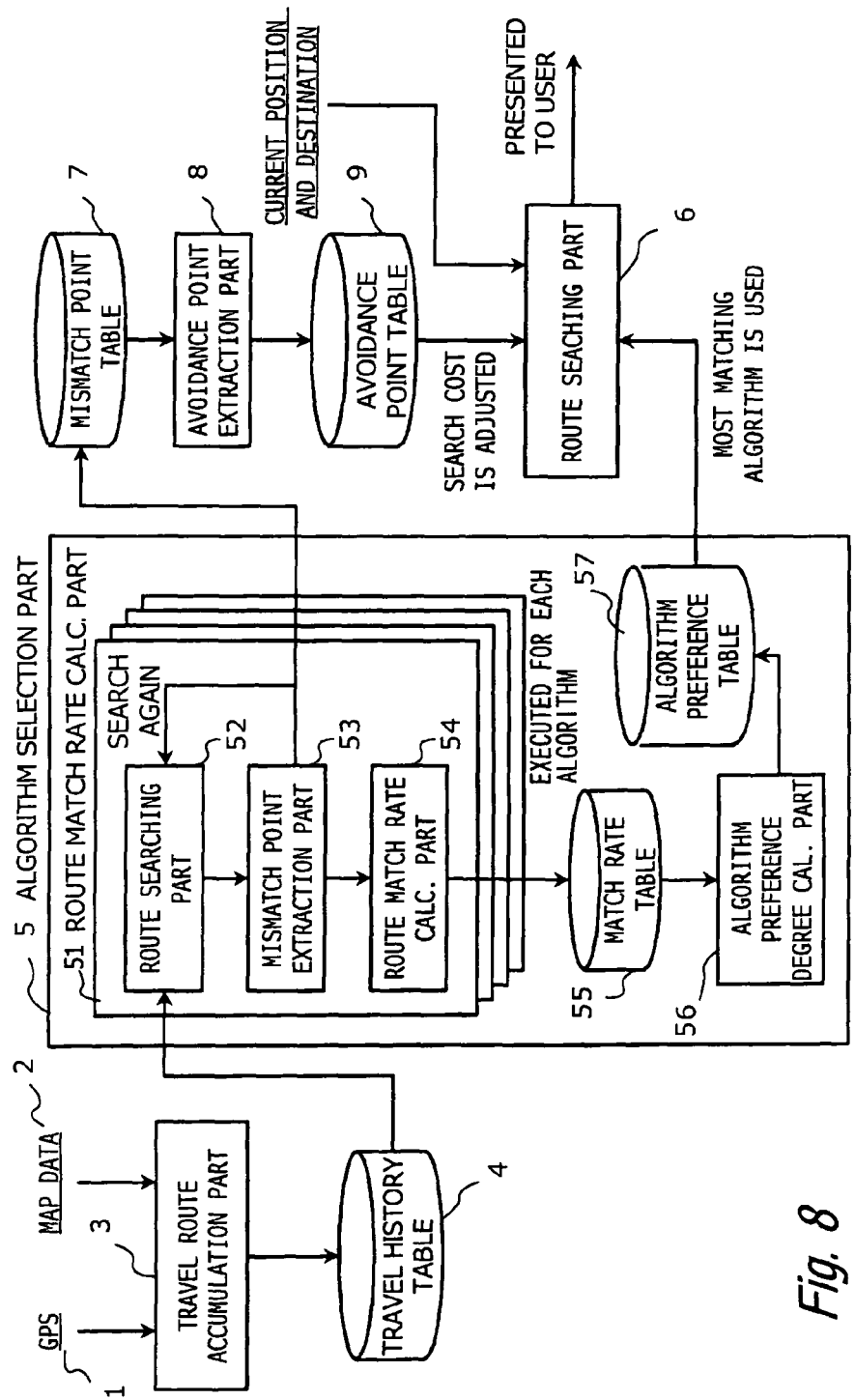
FIG. 8 is a view showing the functional construction of a car navigation apparatus according to a second embodiment of the present invention.

FIG. 8 shows the functional construction of a car navigation apparatus according to the second embodiment of the present invention. What is different from the first embodiment is that provision is made for a mismatch point table 7, an avoidance point extraction part 8, and an avoidance point table 9.

<Avoidance Point Extraction Processing>

Figure 9:
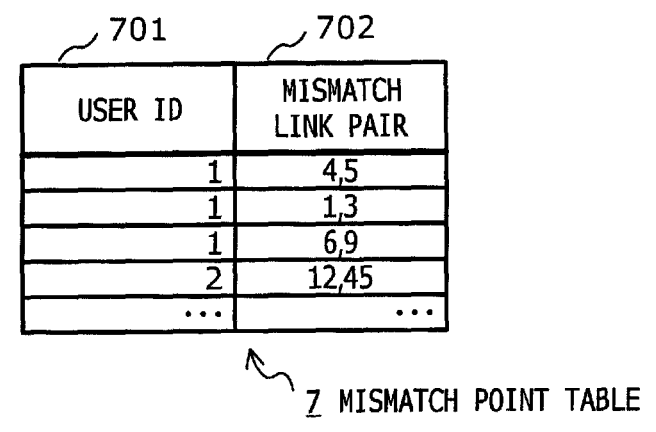

In case where there are mismatch points in an actual travel route and a search result route in the route match rate calculation part 51, the mismatch points are stored in the mismatch point table 7. The mismatch point table 7 stores therein user IDs 701 and mismatch link pairs 702, as shown in FIG. 9. A mismatch link pair is a pair of links for which a mismatch is generated, and in case where a link 2 has actually been traveled at node N1 but a searching algorithm selects link 6, as shown in FIG. 4A, a mismatch link pair becomes to be 2 and 6. Mismatch points are information specific to each user, so they are stored for each user ID.

In FIG. 9, a link pair in which a mismatch has been generated is merely stored, but the frequency of mismatches generated for that link pair and the frequency of times when a route selected according to a searching algorithm and an actual travel route have matched with each other can be stored respectively. That is, the ratio (probability) of occurrence of mismatches can be stored. This is because for a certain link pair, a mismatch is not generated every time, and in many cases, when a link selected by a searching algorithm is traveled, the user does not necessarily avoid that link. Thus, by storing the ratio at which the link is avoided, it becomes possible to determine the link avoided by the user in a more adequate manner.

The avoidance point extraction part 8 extracts from mismatch point table 7 the links (avoidance points) which are avoided by the user. The extraction of the avoidance points is executed by obtaining common points that exist in the mismatch points contained in the mismatch point table 7. For example, some conditions (for example, congestion, right turn, school plant, etc.) that are considered as reasons for mismatches are established, and it is determined whether each mismatch point contained in the mismatch point table meets these conditions. When a predefined condition appear as a mismatch point more than a predetermined number of times, it can be determined that the user avoids the point of such a condition. In addition to that, it is possible to extract avoidance points by using the technique of neural network, etc., too.

Figure 10:
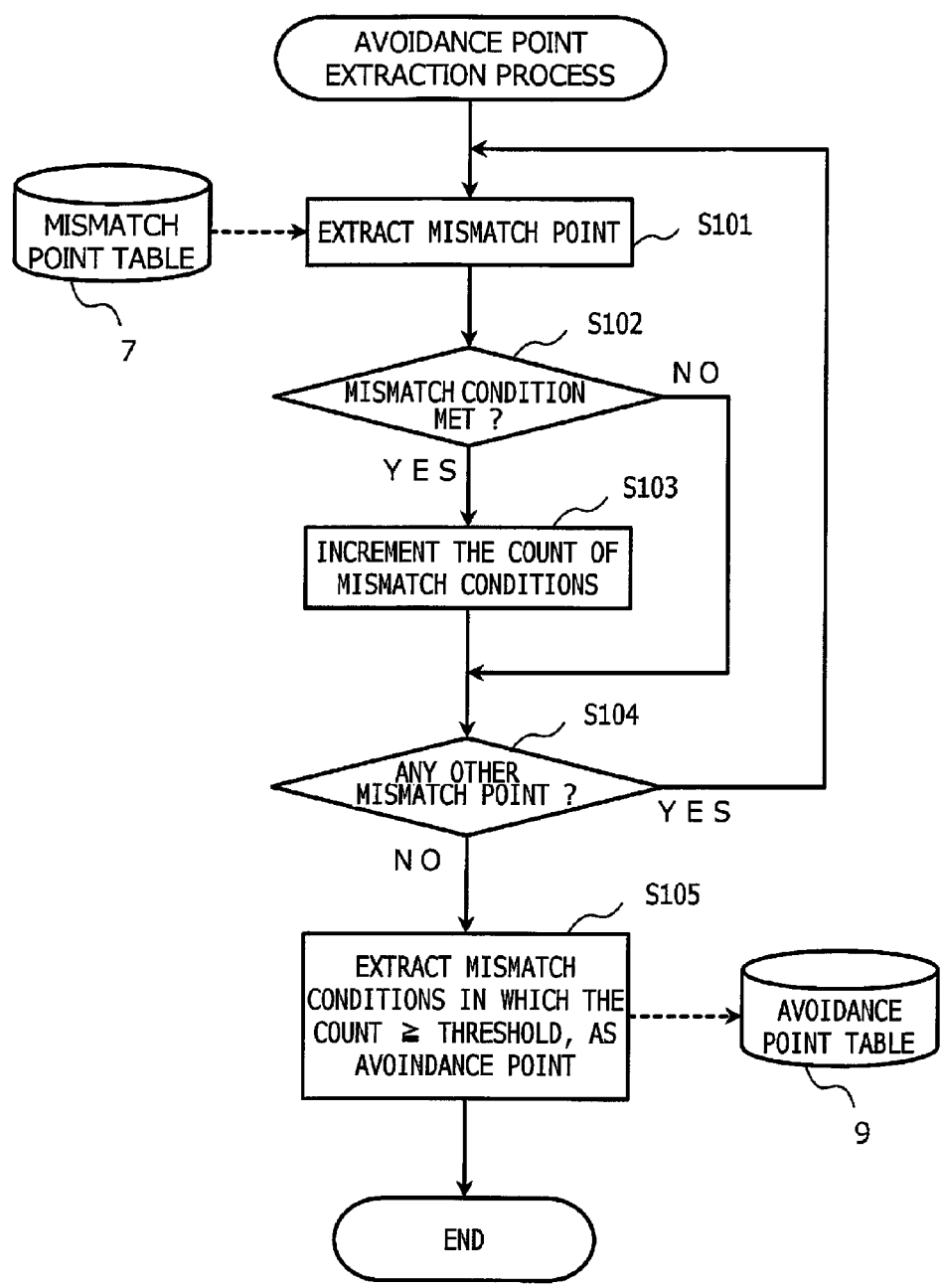
FIG. 10 is a flow chart illustrating the flow of the processing of extracting avoidance points, which is a common condition to mismatch points.

FIG. 10 illustrates, as a flow chart, one example of the flow of avoidance point extraction processing that is carried out by the avoidance point extraction part 8. In this example, the avoidance point extraction part 8 beforehand holds the reasons (mismatch conditions) that are considered as reasons for those points which are avoided by users. For example, school routes, traffic signals, right turns, congestions, etc., can be listed as mismatch conditions.

The avoidance point extraction part 8 extracts mismatch points from the mismatch point table 7 (step S101). Then, it is determined whether the mismatch points thus extracted meet the mismatch conditions beforehand held in the avoidance point extraction part (step S102). For example, in case where a link selected by using a searching algorithm is a school route and a link actually traveled by a user is not a school route, a mismatch condition "school route" will be met. In this case, a count value for the mismatch condition thus met is incremented (step S103). Here, note that one mismatch point might meet a plurality of mismatch conditions. The counting of such mismatch conditions is performed for all the mismatch points (step S104).

Subsequently, when the count value for a mismatch condition becomes equal to or more than a predetermined value, a link having such a condition is extracted as an avoidance point, and is stored into the avoidance point table 9 (step S105). For example, if the count value for the mismatch condition "school route" is equal to or more than the threshold value, a determination can be made that the user tends to avoid school routes, and hence school routes are extracted as avoidance points.

Figure 11:
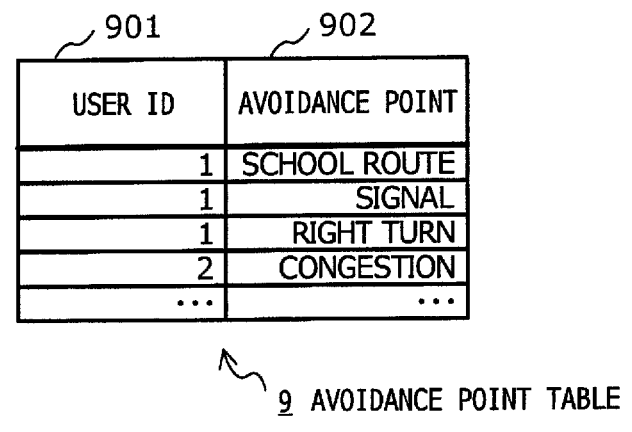

The construction of the avoidance point table 9 is shown in FIG. 11. The avoidance point table 9 includes user IDs 901 and avoidance points 902, and stores therein, for each user, what kinds of points the user avoids.

<Route Selection Processing>

Figure 12:
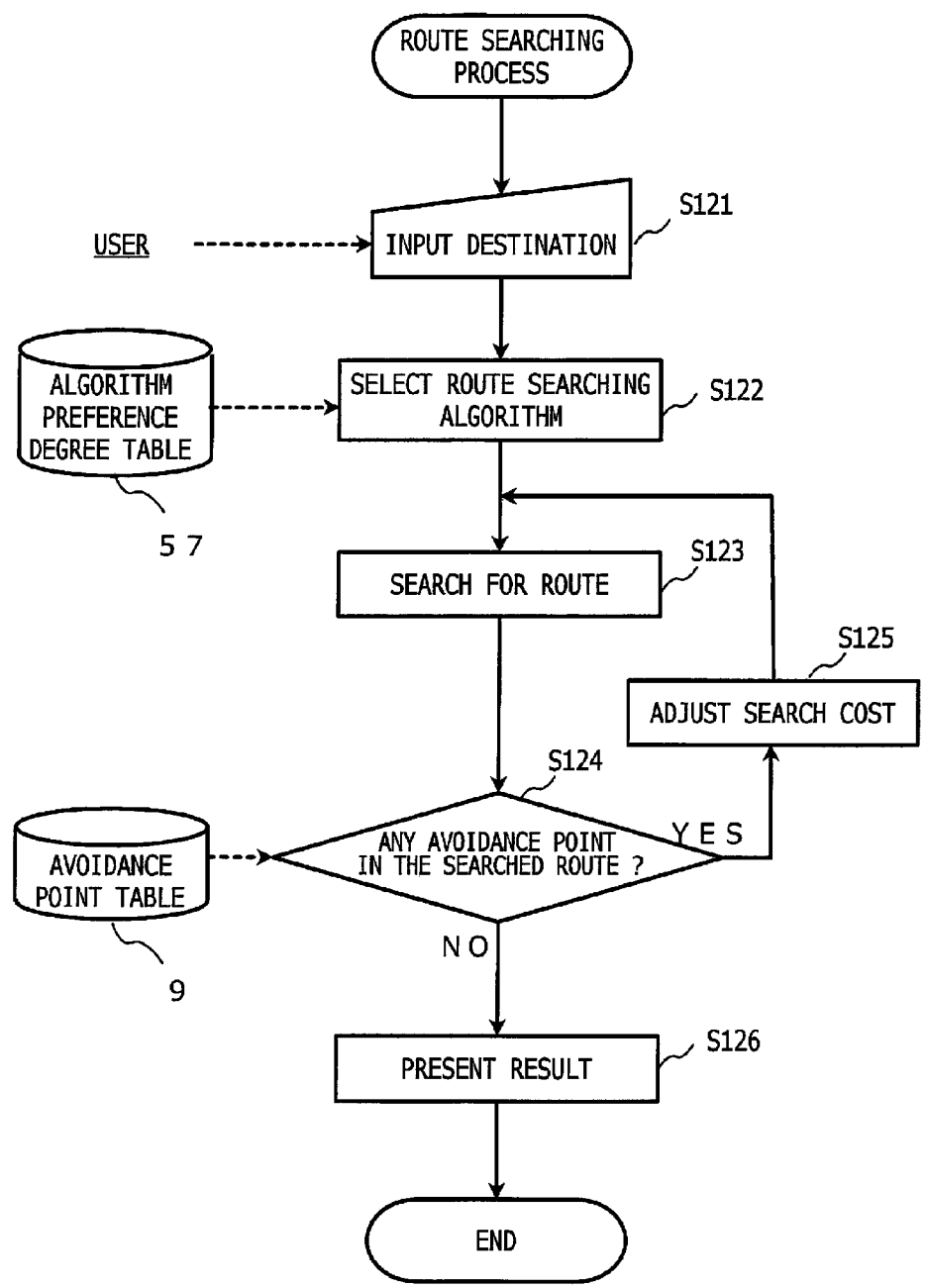
FIG. 12 is a flow chart illustrating the flow of route searching processing.

Next, reference will be made to the route searching processing carried out according to the route searching part 6 by making use of the avoidance points extracted in this manner while referring to a flow chart of FIG. 12. First of all, the route searching part 6 receives an input of a destination from a user (step S121), selects from the algorithm preference degree table 57 a route selection algorithm that meets the route selection preference of the user (step S122), and carries out a route search by using the algorithm thus selected (step S123). Then, it is determined whether there exists a link that matches an avoidance point stored in the avoidance point table 9 in a route obtained as a result of the search (step S124). When there exists an avoidance point on the searched route, an adjustment is performed such that the search cost for the link is increased so as to make the link less prone to be selected (step S125). Thereafter, the route search processing is executed again based on the search cost after having been thus adjusted. Such processing is executed until there exists no avoidance point on the route obtained as a result of the search, or until the same route is searched or obtained even if the search cost is adjusted, but an upper limit value can be set for the frequency of re-search. Then, the route thus obtained is presented to the user as the route resulting from the search (step S126).

<Effects of this Embodiment>

According to this embodiment, it is possible not only to use an algorithm that most meets the route selection preference of a user, among route searching algorithms that have been defined beforehand, but also to perform a route search in such a manner that the roads which the user tends to avoid are made less prone to be selected. That is, it becomes possible to perform a route search reflecting thereon the route selection tendency of the user in a more flexible manner.

REFERENCE SINGS LIST 3 a travel route accumulation part
4 a travel history table
5 an algorithm selection part
51 a route match rate calculation part
55 a match rate table
56 an algorithm preference degree calculation part
57 an algorithm preference degree table
6 a route searching part
7 a mismatch point table
8 an avoidance point extraction part
9 an avoidance point table

The invention claimed is:

1. A route searching apparatus capable of using a plurality of route searching algorithms, comprising:
  a non-transitory computer readable storage medium including a travel history table that stores a history of a travel route;
  a travel route accumulation unit that acquires routes which have been traveled and accumulates the routes in the travel history table;
  an algorithm selection unit that selects a route searching algorithm to meet a preference of a user based on the travel routes accumulated in the travel history table; and
  a route searching unit that performs a route search up to a destination by using the algorithm selected by the algorithm selection unit,
  wherein the algorithm selection unit comprises
    a route searching part configured to search for a route leading from a starting point to a destination point of each of the travel routes accumulated in the travel history table by means of the plurality of algorithms,
    a route match rate table configured to store a route match rate, the route match rate being a match rate between the route obtained as a result of the search and an actual travel route,
    a route match rate calculation part configured to calculate the route match rate for each algorithm and to store the calculated route match rate in the route match rate table,
    an algorithm preference degree table configured to store an algorithm preference degree, the algorithm preference degree being a match rate between a route selection tendency of the user and the algorithm, and
    an algorithm preference degree calculation part configured to calculate, for each algorithm, the algorithm preference degree based on the route match rate of each route stored in the route match rate table,
  and wherein the route searching unit selects, as an algorithm to meet the preference of the user, an algorithm of which the algorithm preference degree with respect to the route selection tendency of the user is the highest.

2. The route searching apparatus as set forth in claim 1, wherein
  the algorithm selection unit further comprises a mismatch point extraction part configured to seek mismatch points that are points at which the route obtained as a result of the search and the actual travel route branch from each other, and
  the route searching part is further configured to perform, when there exists a mismatch point, a new route search from the mismatch point onward, and to calculate the route match rate by making use of this search result, too.

3. The route searching apparatus as set forth in claim 2, further comprising:
  a mismatch point table configured to store mismatch points, the mismatch the mismatch points being points at which the route obtained as a result of the search and the actual travel route branch from each other, wherein
  the algorithm selection unit further comprises a mismatch point extraction part configured to seek the mismatch points and store the mismatch points in the mismatch point table;
  the route searching apparatus further comprising an avoidance point extraction part configured to extract a common point for a plurality of mismatch points stored in the mismatch point table and obtained from a plurality of search results; and
  when performing a route search by means of said selected algorithms, the route searching unit performs the route search by making larger the cost for a link matching the common point.

4. The route searching apparatus as set forth in claim 3, wherein the route searching unit performs the search by using the selected algorithms, and when there exists a link matching the common point on the searched route, a route search is performed again after the cost of the link is set larger.

5. The route searching apparatus as set forth in claim 1, further comprising:
a mismatch point table configured to store mismatch points, the mismatch points being points at which the route obtained as a result of the search and the actual travel route branch from each other, wherein
the algorithm selection unit further comprises a mismatch point extraction part configured to seek the mismatch points and store the mismatch points in the mismatch point table;
the route searching apparatus further comprises an avoidance point extraction part configured to extract a common point for a plurality of mismatch points stored in the mismatch point table and obtained from a plurality of search results; and
when performing a route search by means of the selected algorithms, the route searching unit performs the route search by making larger the cost for a link matching the common point.

6. The route searching apparatus as set forth in claim 5, wherein
the route searching unit performs the search by using the selected algorithms, and when there exists a link matching the common point on the searched route, a route search is performed again after the cost of the link is set larger.

7. A route searching method comprising:
a travel route accumulation step to acquire and accumulate routes which have been traveled;
an algorithm selection step to select a route searching algorithm to meet preference of a user based on the accumulated travel routes; and
a route searching step to perform a route search up to a destination by using the selected algorithm,
wherein the algorithm selection step comprises:
a step to search for a route leading from a starting point to a destination point of each of the travel routes accumulated in the travel route accumulation step by means of a plurality of algorithms,
a step to calculate a route match rate for each algorithm which is a match rate between the route obtained as a result of the search and an actual travel route,
a step to calculate, for each algorithm, a match rate between a route selection tendency of the user and the algorithm based on the route match rate of each route, and a step to select, as an algorithm to meet the preference of the user, an algorithm of which match rate with respect to the route selection tendency of the user is the highest.

8. The route searching method as set forth in claim 7, wherein
in the algorithm selection step, mismatch points are sought that are points at which the route obtained as a result of the search and the actual travel route branch from each other, and when there exists a mismatch point, a new route search is performed from the mismatch point onward, and the route match rate is calculated by making use of this search result, too.

9. The route searching method as set forth in claim 8, wherein
in the algorithm selection step, mismatch points are sought that are points at which the route obtained as a result of the search and the actual travel route branch from each other, and a common point for a plurality of mismatch points obtained from a plurality of search results is extracted; and
in the route searching step, when a route search is performed by means of the selected algorithms, the route search is performed by making larger the cost for a link matching the common point.

10. The route searching method as set forth in claim 9, wherein
in the route searching step, the search is performed by using the selected algorithms, and when there exists a link matching the common point on the searched route, a route search is performed again after the cost of the link is set larger.

11. The route searching method as set forth in claim 7, wherein
in the algorithm selection step, mismatch points are sought that are points at which the route obtained as a result of the search and the actual travel route branch from each other, and a common point for a plurality of mismatch points obtained from a plurality of search results is extracted; and
in the route searching step, when a route search is performed by means of the selected algorithms, the route search is performed by making larger the cost for a link matching the common point.

12. The route searching method as set forth in claim 11, wherein
in the route searching step, the search is performed by using the selected algorithms, and when there exists a link matching the common point on the searched route, a route search is performed again after the cost of the link is set larger.

* * * * *